United States Patent
Tsai

(10) Patent No.: US 7,844,172 B1
(45) Date of Patent: Nov. 30, 2010

(54) ADAPTIVE AUTOFOCUS LENS POSITIONING

(75) Inventor: Richard Tsai, Arcadia, CA (US)

(73) Assignee: Tessera MEMS Technologies, Inc., Arcadia, CA (US)

(*) Notice: Subject to any disclaimer, the term of this patent is extended or adjusted under 35 U.S.C. 154(b) by 189 days.

(21) Appl. No.: 11/859,513

(22) Filed: Sep. 21, 2007

(51) Int. Cl.
*G03B 13/36* (2006.01)

(52) U.S. Cl. .................................. 396/89; 348/345

(58) Field of Classification Search ............ 396/49, 396/77, 89
See application file for complete search history.

(56) References Cited

U.S. PATENT DOCUMENTS

| | | | | |
|---|---|---|---|---|
| 4,762,986 A | * | 8/1988 | Suda et al. | 250/201.2 |
| 5,239,332 A | * | 8/1993 | Muramatsu et al. | 396/95 |
| 5,664,236 A | * | 9/1997 | Utagawa | 396/96 |
| 5,727,238 A | * | 3/1998 | Yamano | 396/104 |
| 5,732,288 A | * | 3/1998 | Muramatsu | 396/49 |
| 5,819,120 A | * | 10/1998 | Hamada et al. | 396/77 |
| 5,839,003 A | * | 11/1998 | Iwane | 396/102 |
| 6,963,360 B1 | * | 11/2005 | Esquibel et al. | 348/207.99 |
| 2003/0071908 A1 | * | 4/2003 | Sannoh et al. | 348/345 |
| 2004/0052514 A1 | * | 3/2004 | Hirai | 396/89 |

FOREIGN PATENT DOCUMENTS

JP 07104173 A * 4/1995

* cited by examiner

*Primary Examiner*—Christopher E Mahoney
*Assistant Examiner*—Leon W Rhodes
(74) *Attorney, Agent, or Firm*—Haynes & Boone, LLP.

(57) ABSTRACT

A method and system for effecting adaptive autofocusing, such as for a camera, are disclosed. The method can comprise obtaining focusing information, such as historic focusing information, storing the focusing information, and subsequently using the focusing information to facilitate a determination of a best position of a focusing lens during a focusing process. The use of such focusing information can result in a better choice for the next focusing lens position to be tested, such that the focusing process can be performed more rapidly.

13 Claims, 4 Drawing Sheets

Example Tables for First and Second Positions

First Step Table

| Current Position | 80 | 90 | 100 | 110 | 120 | 130 | 140 | 150 | 160 | 170 | 180 | 190 | 200 | 210 | 220 | 230 |
|---|---|---|---|---|---|---|---|---|---|---|---|---|---|---|---|---|
| Sharpness | | | | | | | | | | | | | | | | |
| Low | 200 | 200 | 190 | 190 | NG | NG | NG | NG | NG | NG | 80 | 80 | 100 | 100 | 110 | 110 |
| Medium | 150 | 150 | 150 | 150 | 80 | 80 | 80 | 200 | 200 | 200 | 150 | 150 | 150 | 150 | 150 | 150 |
| High | 90 | 100 | 110 | 120 | 130 | 140 | 150 | 140 | 150 | 160 | 170 | 180 | 190 | 200 | 210 | 220 |

Second Step Table

| | 80 | 90 | 100 | 110 | 120 | 130 | 140 | 150 | 160 | 170 | 180 | 190 | 200 | 210 | 220 | 230 |
|---|---|---|---|---|---|---|---|---|---|---|---|---|---|---|---|---|
| Low-Low | 80 | 90 | 100 | 110 | 120 | 130 | 140 | 150 | 160 | 170 | 180 | 190 | 200 | 210 | 220 | 230 |
| Low-Med | NG | NG | NG | NG | NG | NG | NG | NG | NG | NG | NG | NG | NG | NG | NG | NG |
| Low-High | 150 | 150 | 150 | 150 | 150 | 150 | 150 | 160 | 150 | 150 | 150 | 150 | 150 | 150 | 150 | 150 |
| Med-Low | 90 | 100 | 110 | 120 | 130 | 140 | 150 | 140 | 150 | 160 | 170 | 180 | 190 | 200 | 210 | 220 |
| Med-Med | 60 | 70 | 80 | 90 | 100 | 110 | 120 | 130 | 150 | 160 | 200 | 210 | 220 | 230 | 240 | 250 |
| Med-High | 150 | 150 | 150 | 150 | 150 | 150 | 150 | 160 | 150 | 150 | 150 | 150 | 150 | 150 | 150 | 150 |
| High-Low | 90 | 100 | 110 | 120 | 130 | 140 | 150 | 160 | 150 | 160 | 170 | 180 | 190 | 200 | 210 | 220 |
| High-Lower | 60 | 70 | 80 | 90 | 100 | 110 | 120 | 130 | 180 | 190 | 200 | 210 | 220 | 230 | 240 | 250 |
| High-Higher | 90 | 100 | 110 | 120 | 130 | 140 | 150 | 160 | 150 | 160 | 170 | 180 | 190 | 200 | 210 | 220 |

1. NG: AF window/image No Good.

FIG. 3

ADAPTIVE AUTOFOCUS LENS POSITIONING

TECHNICAL FIELD

The present invention relates generally to cameras. The present invention relates more particularly to a method and system for adaptively positioning an autofocusing lens or lens assembly.

BACKGROUND

Autofocus mechanisms for cameras are well known. Such autofocus mechanisms typically move one or more lenses of a camera so as to achieve desired sharpness or focus of an image. Autofocus mechanisms can be either active or passive. Active autofocus mechanisms determine a distance to the subject and then move one or more lenses to a position that has been determined to provide proper focus for that distance. Passive autofocus mechanisms determine the sharpness of images as the focusing lens(es) are moved, so as to determine the particular position where the best focus is obtained.

The distance to the subject can be determined by measuring the time that it takes for a signal, such as infrared light or ultra high frequency sound, to travel to the subject and bounce back to the camera. Triangulation or the amount of light reflected by a scene can also be used to determine distance.

Sharpness of the image can be determined by computer analysis. The lens or lenses are moved while the computer measures the sharpness of each image produced during the movement. The sharpest image can be considered to be the best focused imaged.

To determine sharpness, the computer can look at the difference in intensity between adjacent pixels of an imaging sensor. This can be the same imaging sensor that is used for taking a photograph or can be a different imaging sensor. The frame that provides maximum intensity difference, at least for some portion of the image, is considered to be the best focus.

With either active or passive focusing, a selected portion of the image can be used to determine focus. For example, when a person is being photographed, the person is generally centered in the image. Thus, using the central portion of the image tends to result in the most desirable focus.

Although such autofocus mechanisms have proven generally suitable for their intended purpose, they do possess inherent deficiencies that tend to detract from their overall desirability. For example, contemporary passive autofocus mechanisms typically require that a substantial number of focusing lens positions be tested to determine the best focus.

According to contemporary practice, lens positions can be tested to determine the best focus using either a fixed searching sequence or local searching. In a fixed searching sequence, a number of pre-determined focusing lens locations are tested to determine the best focus. For example, a full scan can involve testing 15 or more focusing lens positions.

When using local searching, a plurality of locations close to one another are searched. The search continues until a local maximum in sharpness is found. The local maximum is chosen as the best focus.

When using fixed searching, the testing of a comparatively large number, e.g. 15 or more, of focusing lens positions makes the autofocusing process take longer than desired. When only using local searching, the presence of a local sharpness maximum that is not the highest sharpness maximum can result in sub-optimal focus.

In view of the foregoing, it is desirable to provide autofocusing that tends to reduce the number of focusing lens positions that are tested and that tends to mitigate the likelihood of sub-optimal focus due to the presence of local sharpness maxima.

BRIEF SUMMARY

A method and system for effecting autofocusing, such as for a camera, are disclosed. An example of an embodiment can comprise a method for adaptively focusing a camera. The method can comprise obtaining focusing information, storing the focusing information, and using the stored focusing information (and optionally current focus information) to facilitate a determination of a best position of a focusing lens during a focusing process. Thus focusing can be performed using historic and/or current focusing information.

An example of an embodiment can comprise an autofocus mechanism comprising a processor and a memory coupled to the processor so as to store the focusing information. The processor can be configured so as to obtain focusing information, to store the focusing information in the memory, and to use the focusing information to facilitate a determination of a best position of a focusing lens during a focusing process.

An example of an embodiment can comprise an autofocus mechanism comprising means for obtaining focusing information, means for storing the focusing information, and means for using the focusing information to facilitate a determination of a position of a focusing lens during a focusing process.

By using stored focusing information, fewer focusing lens position typically need to be tested in order to determine the best focus. Thus, the focusing process can be performed more rapidly.

This invention will be more fully understood in conjunction with the following detailed description taken together with the following drawings.

BRIEF DESCRIPTION OF THE DRAWINGS

FIG. 3 is an example of a table of first and second focusing lens positions, according to an example of an embodiment;

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
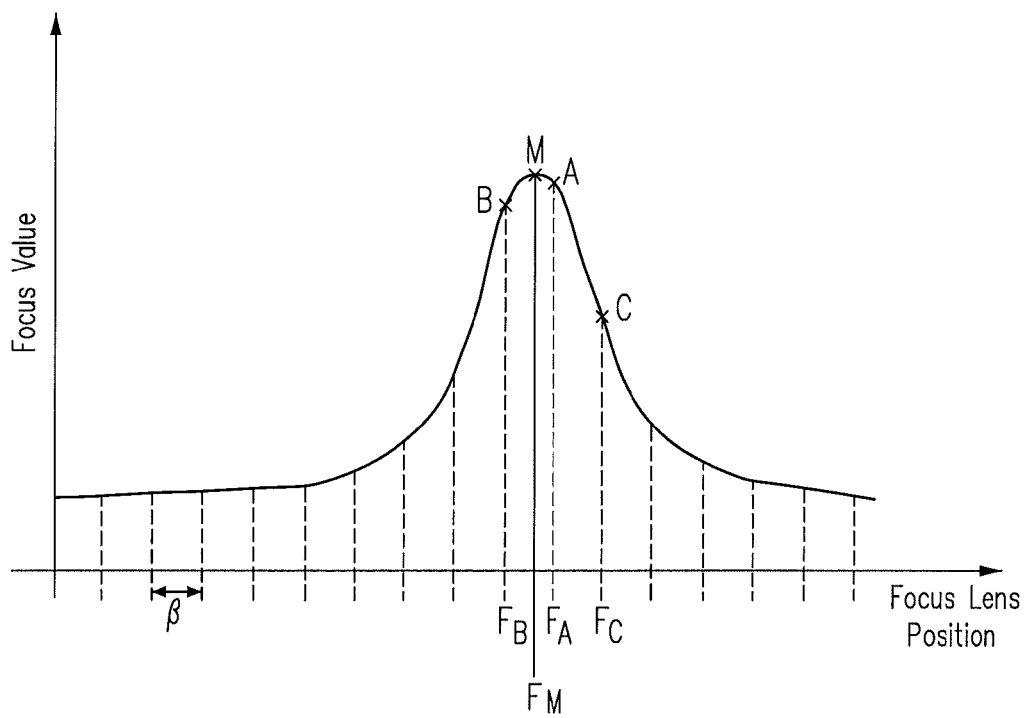
FIG. 1 is a graph showing sharpness, i.e., focus value, as a function of focusing lens position to illustrate a contemporary method of determining focus.

A method and system for providing adaptive autofocus for cameras and the like is disclosed. According to an example of an embodiment, an autofocus system can use historic focus information such as best position and corresponding sharpness score history, either with or without current focus information, to better predict a next focusing lens position to test when determining best focus. The use of such historic information tends to minimize the number of lens positions that need to be searched in order to find the best focus.

More particularly, one or more current parameters, such as sharpness score, last focusing lens position, aperture setting, shutter speed, zoom position, can be used in combination with historic information to determine a likely focusing lens position or a likely starting point for a search for the best focusing lens position. The new focusing lens position or starting point for a search for the best focusing lens position can be determined by assuming that it is that position that was used under similar circumstances before.

That is, a best position history that includes the best focusing lens position and one or more corresponding parameters (such as last focusing lens position, aperture setting, shutter speed, and/or zoom position) can be used to provide a guess or estimate of the best position. This can be accomplished by assuming that when one or more of the parameters is the same for the current exposure as it was for a previous exposure, then the focusing lens position is also the same or approximately the same. A correlation between a parameter or combination of parameters and the best focusing position can be assumed. Thus, a starting point (and possibly the best focus itself), can be provided by the use of such historic information.

For example, it can be assumed that the focusing lens position used the last time a photograph was taken with a particular aperture setting, shutter speed, and/or zoom position will be the focusing lens position that is most likely to be appropriate when the same aperture setting, shutter speed, and/or zoom position are used again. At least, this focusing lens position is likely to be a good starting point in the search for the best focusing lens position. Thus, the use of historic information can expedite the focusing process.

Alternatively, the stored focus information can comprise non-historic information. For example, the focus information can comprise information that was contrived, estimated, calculated, determined empirically, or otherwise obtained. A criteria for such information is that it, at least sometimes, enhances the focus process. Any desired combination of historic and non-historic information can be used in this manner.

The number of lens positions that are searched in order to determine the best focus tends to be mitigated. Thus, searching for best focus tends to be performed more rapidly. This typically results in the camera being ready for the next exposure sooner. A photograph can be taken quicker and/or a plurality photographs can be taken can be taken more rapidly in succession (the frame rate of the camera is enhanced).

Adaptive focusing can utilize either historic information alone or both historic and current information. Indeed, one or more embodiments can use any information that can be correlated, even slightly, to best focus lens position, so as to provide a starting position for a best focus lens position search that is better than a randomly picked starting position or the use of the same position each time (such as in a pre-defined or structured search).

Contemporary autofocus mechanisms use either a predefined sequence of focusing lens positions (a structured search) or use local searching with varying step sizes. By way of contrast, embodiments disclosed herein use additional information, i.e., historic focus information, to determine the next focusing lens position to be tested. The use of historic focus information tends to mitigate the number of steps, i.e., focusing lens positions, that need to be tested so as to substantially reduce the time required for the autofocus process.

A quadratic function can be used to help determine the best focus. This is particularly true when the number of steps is large enough to assure that the curve is close to that of a quadratic function. However, the focus depth in such instances is very narrow. Even with an ideal quadratic equation curve, there is still the need to test a predefined sequence of steps so as to search for the whole range with fixed step size in order to obtain the maximum score and subsequently perform the quadratic estimation. In contemporary focus mechanisms, the focus depth is comparatively long (the depth of field is comparatively large) so as to tend to make most of the area relatively well focused. Hence the score curve is not ideal.

Embodiments disclosed herein can use more information to reduce the number of lens positions and thereby substantially reduce autofocus time. Rather than using long focus depth for quadratic approximation (which causes the sharpness score curve to be far away from quadratic equation so that the approximation is invalid), an embodiment estimates the best position using table look up.

A plurality of different look up tables can be utilized. For example, different tables can be used under different lighting conditions, different color schemes, and/or different previous and/or current focusing lens positions. Each table can comprise historic focus information that facilitates the determination of the most likely best focusing lens position to test next. Thus, focusing lens position testing can be performed according to the real applications and situation so as to use a lookup table containing probability information that is more likely to facilitate determination of the most probable focusing lens position to provide beneficial results.

After a rough focusing lens position has been determined using the lookup table, then a local search can be performed. The local search can use small steps and can vary, i.e., increase or decrease, the step size as needed.

Referring now to FIG. 1, the contemporary process of local searching is shown. According to this process, the focusing lens is moved in the direction of improving focus until a worse focus is found. It is then assumed that the best focus position is near the last two focus positions tested. The resolution of the search can be made finer until a best focus that is acceptably sharp is found.

For example, if a first test is done at focusing lens position A and a second test is done at position B, then it is clear that position B results in a worse focus that position A. A third rest at position C also results in a worse focus than A, thus confirming that a local maximum is present near position A. A search with improved resolution (small steps) near A results in a determination that M is the local maximum.

Local searching provides a straightforward way to reach the local optimum. However, local search is susceptible to becoming stuck at a local optimum and therefor not finding the true best focus. Although local searching can use adaptive step size to speed up the process, it still takes many steps and is consequently very slow.

Figure 2:
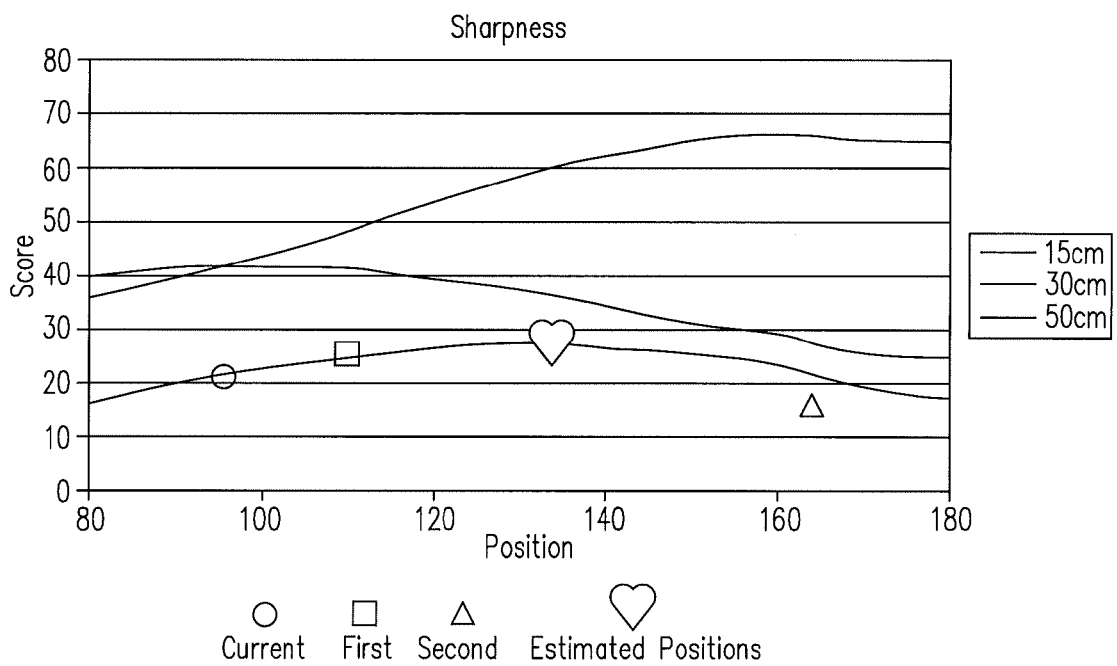
FIG. 2 is a graph showing sharpness, i.e., sharpness scores, as a function of lens position, according to an example of an embodiment.

Referring now to FIG. 2, current, first, second, and estimated positions for focuses at 15 centimeters (corresponding roughly to a macro focus), 30 centimeters (corresponding roughly to a middle distance focus), and 50 centimeters (corresponding roughly to focus at infinity) are shown. The units for focus lens position on the horizontal axis are arbitrary and can be considered as steps (a series of equally spaced positions) at which focus is checked. The units of sharpness are also arbitrary, with higher scores indicated sharper focus.

Operation of an embodiment for focusing upon an object at 30 centimeters is shown with the symbols indicating the sharpness scores for various positions of the focusing lens. A circle indicates that for a current focusing lens position of approximately 95, a sharpness score of approximately 22 is obtained. Stored data show that for a first historic focusing lens position of approximately 108 as indicated by the square, a sharpness score of approximately 25 is obtained and that for a second historic focusing lens position of approximately 163 as indicated by the triangle, a sharpness score of 27 is obtained. Positions and sharpness scores for the current position, the first historic position, and the second historic position are used, such as in a quadric equation, to determine the maximum sharpness score and the corresponding focusing lens position. In this instance, the maximum sharpness score is approximately 28 for a focusing lens position of 135. Thus, a lens position of 135 can be used either as a starting point for a local search for best focus.

According to an embodiment previous focus sharpness information (focusing lens positions and corresponding sharpness scores) can be saved and subsequently used in the autofocusing process. That is, this historic information can, at least in some instances, be used to help determine a starting point for a search, such as a local search as described above. The historic information can be used to define a plurality of search points and can even be used to define a final position for the focusing lens.

According to an embodiment, the focusing lens rough position can be defined. For example, historic information can be used to determine if the focusing lens position is roughly a macro position, a middle position, or a position for focus at infinity.

A desired sharpness score can be defined. For example, a low, medium, high sharpness can be required. Higher resolution for more bins can optionally be provided. A user can make the decision as to the desired sharpness, or it can be made automatically based upon such criteria as distance to the subject and/or available light.

If the current position has a similar sharpness score around the high range and the distribution for all autofocus windows are similar, we can assume the scene is the same and choose one smaller step in the same range. Otherwise, we choose the large step jumping to another range of position.

The first and second focusing lens positions are chosen as described below. If the position is in the macro range and a local search is enough, choose one other position in macro range towards middle range and see if the score increase or decrease then choose the third position accordingly. Otherwise, choose the large step jumping to other range of position. If the position is in macro range, choose one in middle range and see how much the score increased and choose the third position in the infinity range accordingly.

The best position is estimated as described below. Since the points and curve might not fit a quadratic equation ideally, some modification should be necessary. Either table look up or conditional estimation could be possible to decide the best position.

A check can be made to determine if the sharpness score for the estimated position is higher than those of the visited positions. If not, estimate the best position again. Fine search near the estimated is optional.

A comparison is made as described below. If we don't use the current position as one data point, it is one more step already. If we use current point and apply two equal steps, it might not give us the best estimation.

Since the information of current position is used instead of starting from the predefined first position, we can save one position already. Based on the estimation, we might get to the best position in the third step without searching to the last position and go back to the best position. To make sure the estimation is valid, the sharpness function and scaling is important and that can be done in the same current focus position first.

Referring now to FIG. 3, an example of a table showing historic sharpness scores and corresponding focusing lens position for two lens positions is provided. For example, the tables show that the best sharpness score for the medium focus (focus at approximately 30 centimeters) is at a position of 150, 160, and 170 centimeters.

Figure 4:
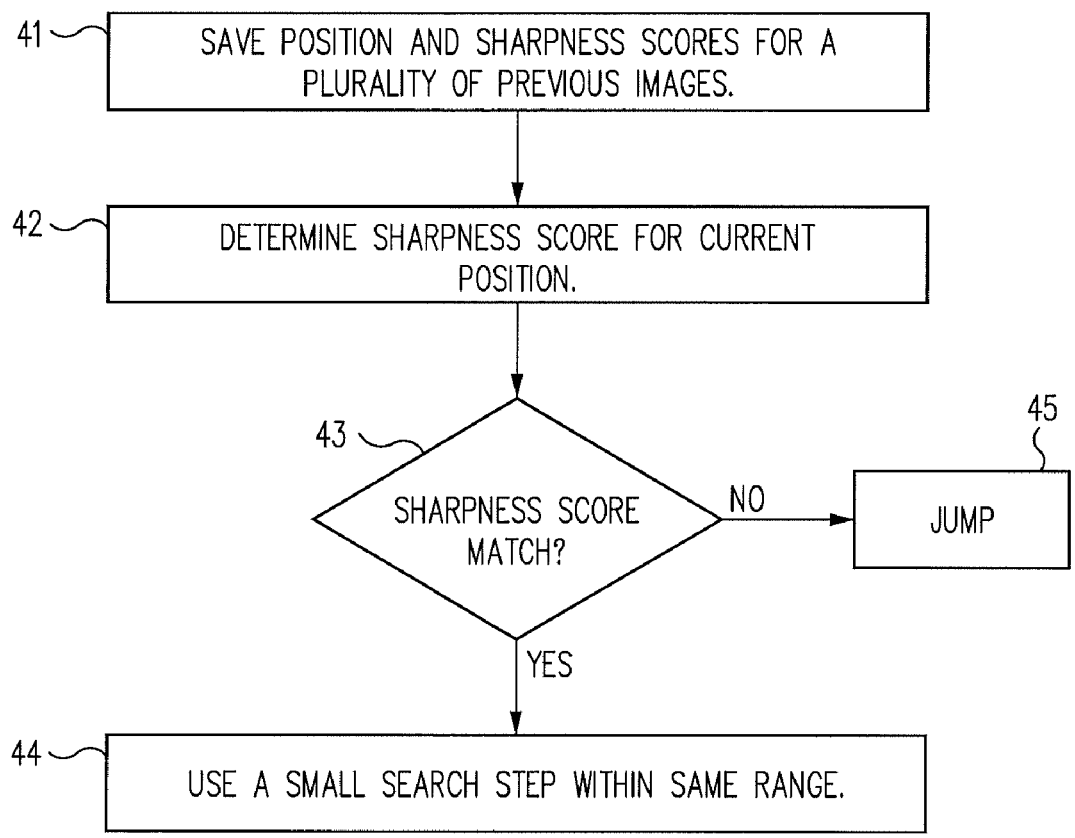
FIG. 4 is a flow chart showing a method for practicing an example of an embodiment.

Referring now to FIG. 4, an example of an adaptive autofocus process is shown. According to this embodiment, focusing lens positions and corresponding sharpness scores are stored in a memory so as to define a lookup table, as indicted in block 41.

A sharpness score for a current focusing lens position is determined as indicated in block 42. The sharpness score can be determined using any desired method. For example, the sharpness score can be determined using Modulation Transfer Function (MTF) as the method for quantifying sharpness.

If the sharpness score for the current lens position is a match with the sharpness score for a lens position in the lookup table, within some predetermined tolerance, then a sharpness score match has occurred. The determination of whether or not such a match has occurred is made as indicated in block 43. When there is such a match, then small steps can be made within the same range, as indicated in block 44. Otherwise, it is necessary to jump to another range.

Figure 5:
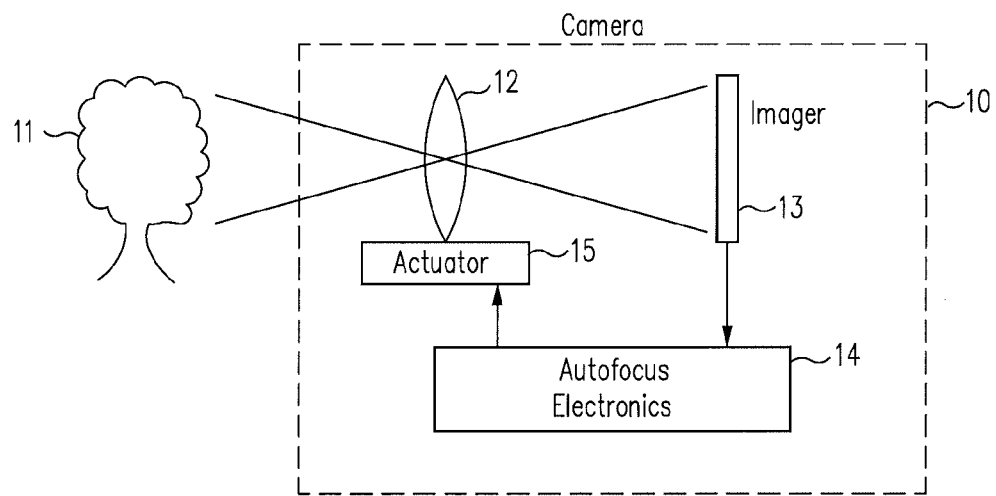
FIG. 5 is a block diagram of an example of an embodiment.

Referring now to FIG. 5, a camera 10 having an example of an embodiment of adaptive autofocusing is shown. An image of a subject 11 is projected via a focusing lens 12 upon imager 13. The imager 13 provides a video signal representative of the image of subject 11 to autofocus electronics 14. Autofocus electronics 14 process the video signal and provides a control signal to actuator 15. Actuator 15 moves the lens 12 in response to the control signal so as to focus the image of subject 11 upon the imager 13.

Autofocus electronics 14 process the video signal from imager 13 to determine if images provided by imager 13 are in focus. When such images are not in focus, then autofocus electrons performs an autofocus procedure to move focusing lens 12 to a new position where the image is in focus. This focusing procedure is somewhat by trial and error, particularly according to contemporary practice. That is, generally a plurality of focusing lens 12 positions are tested and the position providing the best focus is used.

Adaptive autofocus lens positioning tends to reduce the number of focusing lens positions that must be tested by using focusing information, such as historic focusing information, to determine one or more focusing lens positions to be tested. The focusing information tends to provide a head start by assuming that there is some commonality between the current focusing task and a previous focusing task. Some information relating to the current focusing task can be used to look up a previous focusing lens 12 position that is used as the beginning position in a local search, for example.

More particularly, one or more parameters relating to the current focusing task (such as rough distance to the subject, the last focusing lens position, the level of ambient lighting, the balance and/or distribution of colors in the scene being imaged) can be used to look up the beginning focusing lens 12 position in a lookup table stored in memory 17.

For example, if the parameter is level of ambient lighting, then an attempt to find an instance in the lookup table where there was similar ambient lighting. If a suitable close match is found, then the focusing lens 12 position when such ambient lighting was last encountered can be used as the initial focusing lens 12 position for a local search.

Figure 6:
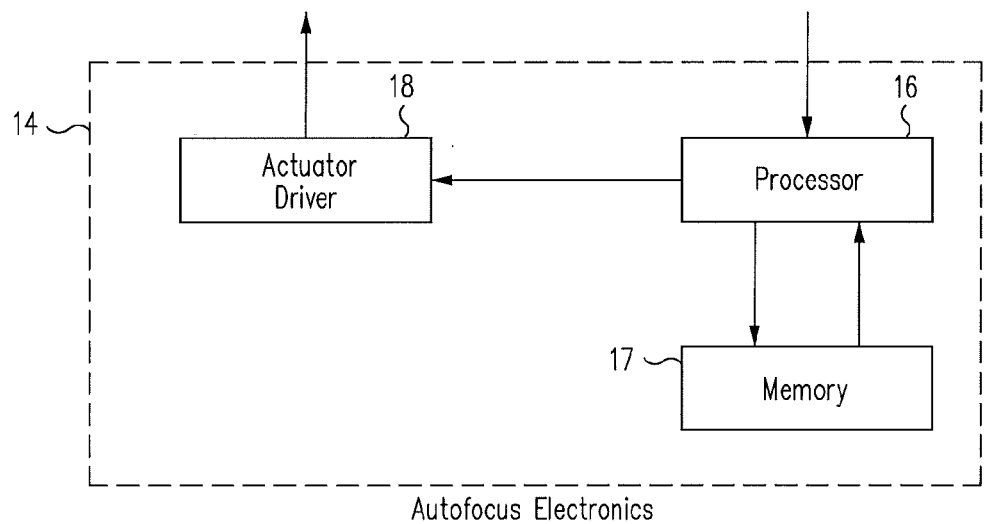
FIG. 6 is a block diagram of the autofocus electronics of FIG. 5.

Referring now to FIG. 6, a processor 16 cooperates with a memory 17 to provide an output to actuator driver 18 that is representative of the desired focusing lens 12 position. Actuator driver 18 provides a drive signal to actuator 15 so as to effect movement of focusing lens 12 to the desired position.

Memory 17 can contain tables of historic focus data as discussed above. Processor 16 can cooperate with memory 17 to perform the process shown in FIG. 4.

Those skilled in the art will appreciate that information representative of focusing lens position includes information representative of the distance to a subject being imaged, since the focusing lens position is dependent upon the distance to the subject.

Those skilled in the art will appreciate that the use herein of the term "best", such as with respect to a position of the focusing lens and with respect to focus, can be defined to include a focus that is better than some other focuses or that is considered to be adequate by any desired standard. The term "best" does not necessarily imply that no better focus is possible.

Although discussed herein as being for a camera, those skilled in the art will appreciate that the autofocus mechanism disclosed herein is similarly suitable for other applications. For example, the autofocus mechanism may be use for focusing binoculars, telescopes, microscopes, and a variety of other devices. Thus, use of the term "camera" is by way of example only, and not by way of limitation.

By using stored focusing, either historic or non-historic information, the number of focusing lens positions that typically need to be tested in order to determine the best focus can be substantially reduced. Thus, the focusing process can generally be performed more rapidly.

One or more embodiments of the present invention can be used in combination with any other desired method for determining focus. For example, one or more embodiments of the present invention can be used in combination with local searching and/or the quadratic formula method.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A method for focusing, the method comprising:
storing image sharpness scores and corresponding focus lens positions for a plurality of previous photographs to form stored historic focusing information;
for a current photograph, determining a current image sharpness score and a corresponding current focus lens position;
comparing the current image sharpness score and the current focus lens position to the stored historic focusing information to determine an initial focus lens position; and
positioning a focus lens at the initial focus lens position.

2. The method as recited in claim 1, wherein the historic focusing information further includes information regarding distances to subjects and corresponding focusing lens positions.

3. The method as recited in claim 1, further comprising obtaining non-historic focusing information.

4. The method as recited in claim 1, further comprising varying a position of the focus lens through a search range that includes the initial focus lens position to determine a best focus for the current photograph.

5. The method as recited in claim 1, wherein the historic focusing information is stored in the memory as at least one lookup table.

6. An autofocus mechanism comprising:
a processor:
memory coupled to the processor for storing image sharpness scores and corresponding focus lens positions for a plurality of previous photographs to form stored historic focusing information; and
wherein the processor is configured to to compare a current image sharpness score and a current focus lens position to the historic focusing information to determine an initial focus lens position.

7. The autofocus mechanism as recited in claim 6, wherein the processor is further configured to command a focus lens actuator to drive a focus lens to the initial focus lens position.

8. The autofocus mechanism as recited in claim 6, wherein the historic focusing information comprises information regarding distances to subjects and corresponding focusing lens positions.

9. The autofocus mechanism as recited in claim 6, wherein the processor is configured to use historic focusing information to facilitate a determination of a best position of a focusing lens during a focusing process, the historic information comprising best position history and sharpness score history.

10. The autofocus mechanism as recited in claim 6, wherein the processor is further configured to use non-historic focusing information to facilitate a determination of a best position of a focusing lens during a focusing process.

11. The autofocus mechanism as recited in claim 6, wherein the processor is configured to define a number of lens positions to search for best focus, the number of positions to search being smaller that the total number of lens positions.

12. The autofocus mechanism as recited in claim 6, wherein the processor is configured to use the historic focusing information to determine a next lens position to check.

13. The autofocus mechanism as recited in claim 6, wherein the processor is configured to use the historic focusing information to determine a next lens position to check in order to obtain additional information to be used in the autofocus process.

* * * * *